(12) United States Patent
Parihar et al.

(10) Patent No.: US 10,091,683 B1
(45) Date of Patent: Oct. 2, 2018

(54) METHOD AND SYSTEM FOR DYNAMIC BEARER CONFIGURATION BASED ON QUANTITY OF SERVED RELAY BASE STATIONS

(71) Applicant: Sprint Spectrum L.P., Overland Park, KS (US)

(72) Inventors: Vanil Parihar, Overland Park, KS (US); Saravana Velusamy, Olathe, KS (US); Sreekar Marupaduga, Overland Park, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 77 days.

(21) Appl. No.: 15/217,408

(22) Filed: Jul. 22, 2016

(51) Int. Cl.
*H04W 28/02* (2009.01)
*H04B 7/155* (2006.01)
*H04L 29/12* (2006.01)
*H04W 88/16* (2009.01)

(52) U.S. Cl.
CPC .... *H04W 28/0257* (2013.01); *H04B 7/15507* (2013.01); *H04L 61/2007* (2013.01); *H04L 61/2076* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,200,391 B2 * | 4/2007 | Chung | H04W 88/085 455/423 |
| 8,989,124 B1 * | 3/2015 | Ramamurthy | H04W 76/022 370/329 |
| 9,300,387 B2 * | 3/2016 | Nishio | H04W 16/26 |
| 9,648,545 B2 * | 5/2017 | Smith | H04W 48/06 |
| 9,648,591 B2 * | 5/2017 | Rastogi | H04W 72/0406 |
| 9,838,924 B2 * | 12/2017 | Zhu | H04W 36/0066 |
| 2012/0108250 A1 * | 5/2012 | Ahn | H04L 1/0002 455/450 |
| 2013/0005378 A1 * | 1/2013 | Hasegawa | H04W 16/06 455/509 |
| 2013/0070596 A1 * | 3/2013 | Yeh | H04W 36/0038 370/235 |
| 2013/0070664 A1 | 3/2013 | Nagata et al. | |
| 2014/0064071 A1 * | 3/2014 | Paladugu | H04W 28/24 370/230 |
| 2015/0289167 A1 * | 10/2015 | Alex | H04W 28/24 370/329 |
| 2016/0156404 A1 * | 6/2016 | Wolfner | H04W 76/023 370/315 |

FOREIGN PATENT DOCUMENTS

WO    WO 2016/059063    4/2016

* cited by examiner

*Primary Examiner* — Hong Cho (57) ABSTRACT

A gateway or other entity will detect when the number of relay base stations served by a relay-WCD changes and will responsively modify a configuration of a bearer that extends between the relay-WCD and the gateway. For instance, in response to detecting an increase in the number of relay base stations served by the relay-WCD, the entity could increase a guaranteed minimum bit rate and/or other quality of service level of the bearer. Or in response to detecting a decrease in the number of relay base stations served by the relay-WCD, the entity could decrease a guaranteed minimum bit rate and/or other quality of service level of the bearer.

20 Claims, 3 Drawing Sheets

METHOD AND SYSTEM FOR DYNAMIC BEARER CONFIGURATION BASED ON QUANTITY OF SERVED RELAY BASE STATIONS

BACKGROUND

A typical wireless communication system includes a number of base stations each radiating to provide coverage in which to serve wireless client devices (WCDs) such as cell phones, tablet computers, tracking devices, embedded wireless modules, and other wirelessly equipped devices, whether or not user operated. In turn, each base station may sit as a node on a core network including entities such as a network controller and a gateway system that provides connectivity with an external transport network such as the Internet. With this arrangement, a WCD within coverage of the system may engage in air interface communication with a base station and may thereby communicate via the base station with various remote network entities or with other WCDs served by the base station.

Such a system may operate in accordance with a particular radio access protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WIFI), BLUETOOTH, and others. Each protocol may define its own procedures for registration of WCDs, initiation of communications, handover between base station coverage areas, and other functions.

Further, each base station may provide wireless service to WCDs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources.

When a WCD initially enters into coverage of such a base station on a carrier, the WCD may engage in an access process to establish a radio-link layer connection with the base station on that carrier, and the WCD may then engage in an attach process through which the system becomes configured to serve the WCD. In an example attach process, for instance, the WCD may transmit an attach request over the air to the base station, and the base station may forward the attach request to the network controller in the core network. After authenticating and authorizing the WCD, the network controller may then then engage in signaling with the base station and with the gateway system, to coordinate and trigger establishment of a network connection for the WCD. In particular, this process may result in setup of a bearer connection or "bearer" that defines a communication channel extending between the WCD and the gateway system via the base station, including a radio portion extending between the WCD and the base station and an access portion extending between the base station and the gateway system. Further, the process may result in the gateway system or an associated server assigning to the WCD an Internet Protocol (IP) address usable by the WCD to engage in packet-data communication.

Any such bearer established for a WCD may have a corresponding defined service level, which could be indicated by one or more bearer attributes stored in context records at entities along the bearer path, such as at the WCD, the base station, and the gateway system. For example, the service could be indicated by a quality of service class identifier (QCI) and/or corresponding differentiated services point code (DSCP) value, which could be predefined to require handling of communications along the bearer in a particular manner. A high QCI level bearer, such as a bearer with QCIs 1-5 for instance, may be deemed to have a particular guaranteed minimum bit rate, so entities along the bearer path would treat communications on such a bearer as having relatively high priority as compared with other communications, in an effort to satisfy that minimum bit-rate requirement. Further, high QCI level bearer may have other high service level requirements instead or as well. Whereas, a low QCI level bearer, such as a bearer with QCIs 6-9 for instance, may be deemed to be a best-efforts bearer, entitled to whatever best treatment is possible, without a guaranteed minimum bit rate or the like.

Once a WCD is so attached, the base station may then provide the WCD with wireless data communication service. In an example arrangement, for instance, when the WCD has data to transmit on the transport network, the WCD may send a scheduling request over the air to the to the base station, the base station may allocate uplink air interface resources to carry the data over the WCD's radio bearer, the WCD may transmit the data on those allocated resources to the base station, and the base station may forward the data via the WCD's access bearer to the gateway system for output onto the transport network. Likewise, when the gateway system receives data for transmission to the WCD, the gateway system may transmit the data via the WCD's access bearer to the base station, the base station may allocate downlink air interface resources to carry the data over the WCD's radio bearer, and the base station may transmit the data on those allocated resources to the WCD.

In normal operation, when a base station operates in such a wireless network, the base station may thus engage in various types of communication with other network entities. Such communication could be categorized into "control-plane communication" and "user-plane communication". The control-plane communication encompasses any of the base station's control signaling with other core network entities to help manage operations in the wireless network and service of WCDs, and could thus include communications such as bearer setup signaling, tracking area update signaling, paging, handover signaling, the like. Whereas, the user-plane communication encompasses bearer data being communicated to or from one or more WCDs served by the base station, such as packet data that the base station receives from a gateway system and then schedules/transmits to a WCD and packet data that the base station receives from a WCD and forwards to a gateway system for transmission on a transport network.

OVERVIEW

Optimally, a wireless service provider will strategically implement base stations throughout a market area so that served WCDs can move between the base stations' coverage areas without loss of coverage. Each base station may include an antenna structure and associated equipment, and the wireless service provider may connect the base station by a landline cable (e.g., a T1 line) with the service provider's core network, to enable the base station to communicate with the signaling controller, the gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the core network in such a situation, the wireless service provider may implement a wireless relay backhaul connection in which the base station includes or is interconnected (e.g., via a local area network (LAN)) with a special WCD that is served by a base station already connected with the core network. With this arrangement, the existing core-network-connected base station is referred to as a "donor base station," the special WCD is referred to as a "relay-WCD," and the base station at issue is referred to as a "relay base station." In operation, the donor base station then serves the relay-WCD in much the same way as any base station would serve a WCD, the relay-WCD effectively serves the relay base station, operating as an intermediary between the relay base station and the donor base station, and the relay base station serves other WCDs in much the same way as any base station would.

To enable the relay base station in this arrangement to communicate with other core network entities (such as the signaling controller, the gateway system, and other base stations), the service provider may implement a relay-gateway system or the like within the core network and may configure a communication path between the relay base station and that relay-gateway system. (In practice, the relay-gateway system could be integrated with the conventional gateway system discussed above but could serve to provide internal core network connectivity rather than external transport network connectivity.)

In particular, when the relay-WCD first sends an attach request, the relay-WCD may include a special identifier indicating that the relay-WCD is a relay-WCD rather than a conventional end-user WCD. Upon receipt of that attach request, the signaling controller may thus determine that the relay-WCD is a relay-WCD and, in response, may coordinate, trigger, or facilitate setup of a bearer between the relay-WCD and the internal relay-gateway system rather than between the relay-WCD and the conventional gateway system. Further, the relay-gateway system or an associated server may assign a core-network IP address for use by a relay base station served by the relay-WCD, and the relay-WCD may pass that IP address assignment along to the relay base station.

With this arrangement in place, the relay base station may then engage in communication with other core network entities (e.g., with the signaling controller, the conventional gateway system, and other base stations) as any other base station would do. However, the communication would pass via the wireless backhaul connection and the relay-gateway system. In particular, the communication would pass via (i) the connection or integration between the relay base station and the relay-WCD and (ii) the relay-WCD's connection via the donor base station.

In practice, a relay-WCD such as this may serve as intermediary for more than one relay base station, with multiple relay base stations each having a separate connection with the relay-WCD and/or being daisy-chained through one another and thereby connected with the relay-WCD. A problem with having multiple relay base stations be connected with the core network through a single relay-WCD, however, is that the relay-WCD's bearer connection into the core network may serve as a bottleneck. In particular, the relay-WCD's bearer connection may be configured with certain operational or performance attributes that may work well to support a single relay base station but may be inadequate to support multiple relay base stations.

By way of example, a relay-WCD's bearer may be configured to guarantee a particular minimum bit rate or other quality of service attribute(s) suitable to support the extent control-plane and user-plane traffic that would be expected to flow to and from a single relay base station via the relay-WCD. But if the relay-WCD serves two or more relay base stations, that guaranteed minimum bit rate or other quality of service attribute(s) may be insufficient to support the extent of control-plane and user-plane traffic that may flow cooperatively to and from those multiple relay base stations via the relay-WCD. As a result, user-experience issues and other problems may arise.

Disclosed herein is a method and system to help address this issue. In accordance with the disclosure, a gateway or another entity (one or more entities) will detect when the number of relay base stations served by a relay-WCD changes and will responsively modify a configuration of the bearer that extends between the relay-WCD and the gateway. For instance, in response to detecting an increase in the number of relay base stations served by the relay-WCD, the entity could increase a guaranteed minimum bit rate and/or other quality of service level of the bearer. And in response to detecting a decrease in the number of relay base stations served by the relay-WCD, the entity could decrease a guaranteed minimum bit rate and/or other quality of service level of the bearer. In this process, the bearer remains in effect, but one or more configuration attributes of the bearer are modified in view of the change in number of relay base stations served by the relay-WCD.

Accordingly, in one respect, disclosed is a method for configuring a bearer that carries data between a WCD and a gateway, where the bearer extends via a donor base station that serves the WCD, where the WCD serves at least one relay base station, where data flows between each of the at least one relay base station and the gateway via the WCD and the bearer, and where the bearer has a configuration including at least a service level, such as a guaranteed minimum bit-rate, of the bearer. As disclosed, the method includes detecting a change in quantity of the at least one relay base station served by the WCD. Further, the method includes, in response to the detected change in quantity of the at least one relay base station served by the WCD, modifying the configuration of the bearer, including at least modifying the service level, such as the guaranteed minimum bit-rate level, of the bearer.

In another respect, disclosed is a gateway arranged to configure a bearer that carries data between a WCD and the gateway, where the bearer extends via a donor base station that serves the WCD, where the WCD serves at least one relay base station, wherein data flows between each of the at least one relay base station and the gateway via the WCD and the bearer, and where the bearer has a configuration including at least a minimum bit-rate level of the bearer. As disclosed, the gateway includes a network communication interface through which the gateway communicates on the bearer. Further, the gateway includes a processing unit. And the gateway includes program instructions executable by the processing unit to cause the gateway to (i) detect a change in quantity of the at least one relay base station served by the WCD and (ii) in response to the detected change in quantity of the at least one relay base station served by the WCD, modify the configuration of the bearer, including at least modifying the minimum bit-rate level of the bearer.

Still further, in another respect, disclosed is a system including a gateway, a donor base station, a WCD, and at least one relay base station. As disclosed, the donor base station serves the WCD, and the WCD directly or indirectly serves each of the at least one relay base station. Further, a bearer extends between the WCD and the gateway via the donor base station, data flows between each of the at least one relay bas station and the gateway via the WCD and the bearer, and the bearer has a configuration including at least a minimum bit-rate level of the bearer. The gateway is then arranged to modify the configuration of the bearer, including modifying at least the minimum bit-rate level of the bearer, in response to detecting a change in quantity of the at least relay base station served by the WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus on application in the context of LTE as an example radio access protocol and associated network arrangement. However, it will be understood that principles of the disclosure can extend to apply in other scenarios as well, such as with respect to other radio access protocols. Further, even within the context of LTE, variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
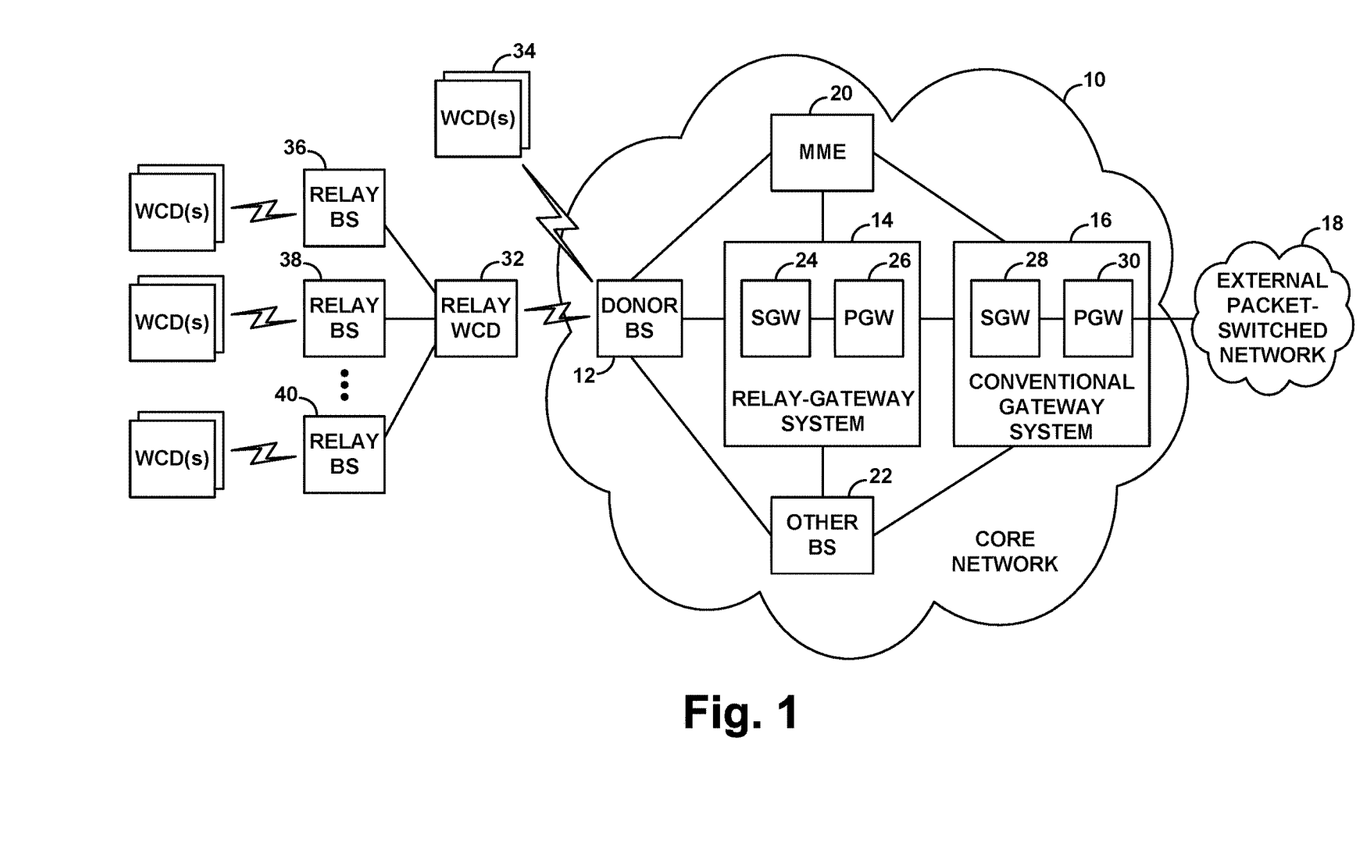
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts a representative LTE core network 10, which functions primarily to serve WCDs with wireless packet data communication service, including possibly voice-over-packet service, but may also provide other functions. The core network 10 may be a packet-switched network, compliant with the industry standard system architecture evolution (SAE) for the LTE protocol, and thus the entities shown on the core network may each have an IP address and be configured to communicate with each other over packet-based tunnels or other communication interfaces.

As shown, network 10 includes an example donor base station (BS) 12, which has an antenna structure and associated equipment (not shown) for providing LTE coverage in which to serve the WCDs. The donor base station 12 then has a communication interface with an example relay-gateway system 14, which provides connectivity into the core network, to facilitate communication with other core network entities such as (i) a conventional gateway system 16 that provides connectivity with an external packet-switched network 18, (ii) a mobility management entity (MIME) that functions as a signaling controller, and (iii) another representative base station 22.

The relay-gateway system 14 is shown by way of example including a serving gateway (SGW) 24 and a packet-data network gateway (PGW) 26. In practice, the SGW 24 may be the component of the relay-gateway system that interfaces the donor base station 12, the SGW 24 may have a communication interface with the PGW 26, and the PGW 26 may then function as a gateway generally into the core network, to facilitate communication with the other core network entities.

Likewise, the conventional gateway system 16 is shown by way of example including an SGW 28 and a PGW 30. And in practice, the SGW 28 may be the component of the conventional gateway system that interfaces with base stations, the SGW 28 may have an interface with the PGW 30, and the PGW 30 may function as a gateway into the external packet-switched network 18, to facilitate communication on that network.

As noted above, the relay-gateway system and conventional gateway system could be integrated together but could serve these different purposes, with the relay-gateway system providing for internal core-network communication and the conventional gateway system providing for external transport network communication.

FIG. 1 additionally shows, within coverage of donor base station 12, a representative relay-WCD 32, which may be a conventional or specially configured WCD that is in place to provide wireless backhaul connectivity for at least one relay base station, as well as one or more non-relay WCDs 34. Further, FIG. 1 shows three representative relay base stations 36, 38, 40, which may be conventional base stations that could be connected or integrated with the relay-WCD 32 so as to attain wireless backhaul connectivity with the core network 10 and thereby function as relay base stations. And FIG. 1 shows within the coverage of each relay base station one or more representative WCDs, which could be end-user WCDs or could be relay-WCDs connected or integrated with one or more additional relay base stations (not shown) to provide a daisy-chained configuration.

With this arrangement, the donor base station 12 serves the relay-WCD 32 over an air interface, the relay-WCD 32 functions as an intermediary between the donor base station 12 and the relay base stations 34, 36, 38, thus effectively serving those relay base stations by providing them with wireless backhaul connectivity to the core network 10. And the relay base stations then serve one or more other WCDs.

In practice, each of the illustrated WCDs may be configured within the network 10 as a device to be served by the network (such as an authorized subscriber device), and a mechanism may be provided to distinguish relay-WCDs from non-relay WCDs, so as to facilitate treating relay-WCDs differently than non-relay WCDs. By way of example, a relay-WCD may have a special identifier or operate and be served by the network under a special network identifier (e.g., a special public land mobile network (PLMN) identifier, or special packet data network (PDN) connection identifier), indicating that the relay-WCD will be operating as a relay-WCD. Whereas a non-relay WCD may have an identifier or be served by the network under an identifier that does not indicate the WCD will be operating as a relay-WCD, thus establishing that the WCD is not a relay-WCD. Accordingly, when a WCD attaches with the network, the network may determine whether the WCD is a relay-WCD or not, based on such identification or other information provided by the WCD during attachment or noted in a network profile record for the WCD.

In an LTE network such as this, when base station 12 is put in service, the base station 12 may acquire an IP address for use within the network 10. Further, the base station 12 may then engage in signaling ((stream control transmission protocol (SCTP) signaling) with MME 20 to establish an S1-AP connection (S1-AP interface) with the MME. To facilitate this, the base station 12 may be pre-provisioned with data specifying the IP address of the MME so that the base station 12 can engage in signaling with the MME to set up that connection. This S1-AP connection with the MME then serves as a signaling channel between the base station 12 and the MME.

When a WCD (such as relay-WCD 32 or a non-relay WCD 34) initiates attachment with base station 12, base station 12 may then signal to the MME 20 to trigger establishment for the WCD of a tunnel between the base station 12 and the MME. Further, this signaling may also cause the MME to coordinate, trigger, or facilitate establishment of a network connection for the WCD, which may vary based on whether the WCD is a conventional, non-relay WCD or rather a relay-WCD (e.g., as indicated by the WCD's PLMN identifier or other data).

If the WCD is a conventional WCD, then the MME may engage in signaling with the base station 12 and the conventional gateway system 16 to coordinate and trigger establishment of a bearer extending between the WCD and the conventional gateway system 16, with the conventional gateway system 16 or an associated server assigning to the WCD an IP address for use to communicate on the external packet-switched network 18. Whereas, if the WCD is a relay-WCD, then the MME may engage in signaling with the base station 12 and the relay-gateway system 16 to coordinate and trigger establishment of a bearer extending between the WCD and the relay-gateway system 16, with the relay-gateway system 16 or an associated server assigning to the WCD an IP address for use to communicate internally on the core network 10.

In an example implementation, when a relay-WCD initially attaches, a first such network connection (a first access point name (APN) connection, APN1) may be established between the relay-WCD and the relay-base station. In particular, through signaling between the MME 20 and the SGW 24, signaling between the SGW 24 and the PGW 26, signaling between the MME 20 and the base station 12, and signaling between the base station 12 and the relay-WCD 32, a first default bearer may be established for the relay-WCD. This default bearer could be a best-efforts bearer such as a QCI 6 bearer. Further, the PGW 26 or an associated server such as a Dynamic Host Control Protocol (DHCP) server (not shown) may assign to the relay-WCD a core-network IP address for use on the core network, with the IP address assignment passing through return signaling to the relay-WCD.

When a relay base station such as any of those shown in FIG. 1 is connected (e.g., via a direct or LAN connection) with the relay-WCD, the relay base station may conventionally transmit a DHCP DISCOVER message seeking assignment of an IP address. Such a DHCP DISCOVER message may carry a client-ID of the relay base station and a media access control (MAC) address of the relay base station. When the relay-WCD receives this DHCP DISCOVER request, the relay-WCD, the relay-WCD may then engage in a second attach process, to establish a second network connection (APN2), specifically for relay base station service.

This second attach process may result in establishment for the relay-WCD of two bearers, a default bearer (e.g., a QCI 6 bearer) (for carrying user-plane traffic to and from WCDs served by a relay base station) and a dedicated bearer (e.g. a QCI 5 bearer) (for carrying signaling traffic between the relay base station and other core network entities such as the MME and other base stations). Further, the process may also result in assignment to the relay-WCD, for APN2, a dummy IP address (e.g., 0.0.0.0) for the time being.

In particular, the relay-WCD may include in its attach request for APN2 a flag of some sort indicating that this is an APN2 request or is for relay base station service, the MME may responsively engage in signaling with the relay-gateway system to initiate establishment of a default bearer for APN2, the PGW 26 may assign the dummy IP address, and the tunnels and context records for the relay-WCD get established or updated to indicate APN2 and this default bearer. Further, piggybacking with some of this signaling and/or in response to establishment of the default bearer, the PGW 26 may then start network-initiated establishment of the dedicated bearer for APN2, with signaling from the PGW 26 signaling to the SGW 24, signaling from the SGW 24 to the MME 20, signaling from the MME 20 to the base station 12, and signaling from the base station 12 to the relay-WCD 32. This signaling may specify attributes of the dedicated bearer, including QCI level (e.g., QCI 5) and/or specific indications of particular quality of service parameters such as guaranteed minimum bit rate level, latency tolerance, and so forth. These dedicated bearer attributes may then be stored in context records at the entities in the bearer path, such as at the PGW 26, the SGW 24, the donor base station 12, and the relay-WCD 32, establishing bearer attributes defining how communications on the dedicated bearer will be treated.

Once APN2 is so established in this example implementation, the relay-WCD may then forward the relay base station's DHCP DISCOVER request via the default bearer of APN2 to the PGW 26, which PGW 26 may note is for a relay base station in view of the client-ID and/or another flag in the request. The DHCP server may then responsively assign a locally routable core-network IP address (to the relay-WCD, but essentially for the relay base station), which the relay-WCD may receive in response signaling and may pass along to the relay base station for use by the relay base station as its IP address on the core network.

In practice as noted above, additional relay base stations may then be networked with the same relay-WCD. When a new relay base station connects with the relay-WCD (e.g., when the service provider or other entity installs a new base station that seeks to attain a wireless relay backhaul connection), that new relay base station may send a DHCP DISCOVER request as discussed above, which may carry a client-ID and MAC address of the new relay base station. In this situation, though, the relay-WCD may simply forward the DHCP DISCOVER request via the dedicated bearer or default bearer of the APN2 connection. The DHCP DISCOVER request would thus pass to the PGW 26 of the relay-gateway system, and the DHCP may assign a core-network IP address for the relay base station, with the IP address assignment passing to the relay-WCD and the relay-WCD passing along to the new relay base station.

As each such relay base station thereby acquires a core network IP address, the relay base station may then operate on the core network with that address, in much the same way that any base station on the core network would operate. However, communications between the relay base station and other core network entities would pass via the wireless relay backhaul connection and the APN2 connection and via the relay-gateway system.

As noted above, a potential problem with the above process is that a bearer is established for the relay-WCD's relay base station service may have particular service level attributes that may be insufficient to support multiple relay base stations connected through the relay-WCD. This bearer may be one of the two APN2 bearers discussed above, such as the dedicated APN2 bearer for instance. If that dedicated APN2 bearer carries signaling communication with the MME and with other base stations, it may be especially important for that bearer to provide a sufficient service level, to facilitate timely and proper relay base station service. If the bearer service level is insufficient to support use by multiple relay base stations, service problems could thus arise.

In line with the discussion above, a solution to this problem is to have a gateway or one or more other entities dynamically modify a configuration of the bearer, and particularly dynamically modify a service level of the bearer, in response to detecting a change in the number of relay base stations served by the relay-WCD.

In an example implementation, the PGW 26 of the relay-gateway system will dynamically vary one or more attributes, such as a guaranteed minimum bit-rate level, of the relay-WCD's APN2 dedicated bearer in response to detecting a change in the number of relay base stations served by the relay-WCD. For instance, the PGW 26 may keep track of the number of relay base stations serviced by the relay-WCD by tracking the number of DHCP DISCOVER requests and/or responsive IP address assignments flowing over the relay-WCD's APN2 default bearer or dedicated bearer for unique client-IDs of relay base stations. As the number of such relay base stations increases, the PGW 26 may change one or more service level attributes of the relay-WCD's APN2 dedicated bearer, to allow for a greater extent of communication on the APN2 dedicated bearer, and vice versa.

For instance, the PGW 26 may send a modify-bearer request to the SGW 24 to invoke modification of the APN2 dedicated bearer to increase the guaranteed bit rate level or otherwise change one or more service level attributes of the bearer, so as to accommodate a greater number of relay base stations being serviced by the relay-WCD, and so forth. Such signaling may then result in further associated signaling propagating from the SGW 24 to the MME 20, from the MME 20 to the donor base station 12, and from the donor base station 12 to the relay-WCD 32. Further, each such entity in the bearer path may responsively update its context record for the bearer at issue, so as to indicate one or more modified configuration attributes. As each such entity then processes communication via the bearer, the entity may accordingly apply the modified configuration attributes.

Optimally through this process, as additional relay base stations become connected with and via the relay-WCD, the relay-WCD's bearer for use in providing relay base station service will thus be dynamically reconfigured to accommodate more traffic as expected from the additional relay base stations. Likewise, as relay base stations are removed (e.g., as DHCP RELEASE requests are sent for individual relay base stations), the bearer could be dynamically reconfigured with a reduced service level to accommodate the expected reduced extent of traffic.

Figure 2:
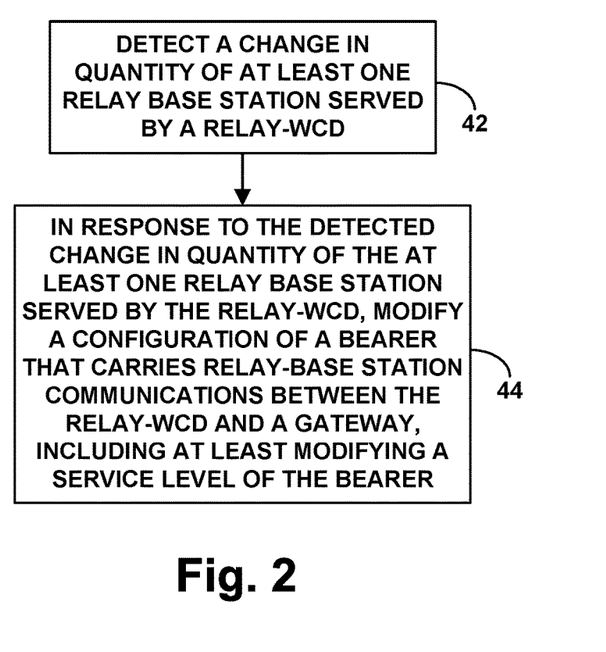
FIG. 2 is a flow chart depicting operations that can be carried out in accordance with the disclosure.

FIG. 2 is next a flow chart depicting operations that can be carried out in accordance with this process. In line with the discussion above, these operations could provide for configuring a bearer that carries data (e.g., user-plane and/or control-plane traffic) between a WCD and a gateway, where the bearer extends via a donor base station that serves the WCD, where the WCD serves at least one relay base station, where data flows between each of the at least one relay base station and the gateway via the WCD and the bearer, and where the bearer has a configuration including at least a service level of the bearer. As shown in FIG. 2, at block 42, the operations include detecting a change in quantity of the at least one relay base station served by the WCD. Further, at block 44, the operations include, in response to the detected change in quantity of the at least one relay base station served by the WCD, modifying the configuration of the bearer, including at least modifying the service level of the bearer.

In this process, the gateway could be part or all of the relay-gateway system, such as the PGW component of that system for instance. Further, the depicted operations could be carried out by the gateway.

In addition, the act of detecting the change in quantity of the at least one relay base station served by the WCD could involve detecting an increase in the quantity of the at least one relay base station served by the WCD, the service level of the bearer could include a guaranteed minimum bit-rate of the bearer, and the act of modifying the configuration of the bearer in response to the detected change could involve increasing the guaranteed minimum bit-rate level of the bearer due to the increase in the quantity of the at least one relay base station served by the WCD.

Further, for each relay base station served by the WCD, the gateway could receive via the WCD (e.g., traversing the bearer or an associated bearer (e.g. of the same APN connection) from the WCD to the gateway) from the relay base station an IP address assignment request (e.g., a DHCP DISCOVER request), in which case the act of detecting the change in quantity of the at least one relay base station served by the WCD could be based on receipt of a new IP address assignment request from a new relay base station via the WCD. Alternatively or additionally, for each relay base station served by the WCD, an IP address assignment could pass from the gateway to the relay base station via the WCD (e.g., traversing the bearer or an associated bearer from the gateway to the WCD), in which case detecting the change in quantity of the at least one relay base station served by the WCD could be based on a new IP address assignment passing to a new relay base station via the WCD.

Still further, the act of modifying the configuration of the bearer in response to the detected change could involve (i) updating a bearer context record at the gateway and (ii) transmitting from the gateway a modify-bearer request that triggers updating of a bearer context record respectively at each of one or more entities in a path of the bearer. In practice, for instance, the gateway could be a PGW, the PGW could transmit the modify-bearer request to an SGW, and the one or more entities could include the SGW and the donor base station.

Figure 3:
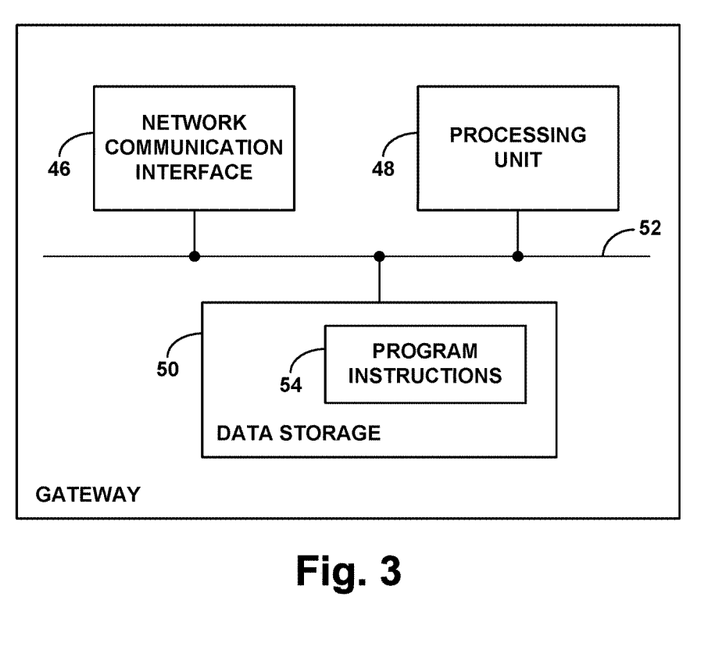
FIG. 3 is a simplified block diagram of gateway operable in the disclosed system.

FIG. 3 is next a simplified block diagram of a gateway arranged to configure a bearer that carries data between a WCD and the gateway, where the bearer extends via a donor base station that serves the WCD, where the WCD serves at least one relay base station, where data flows between each of the at least one relay base station and the gateway via the WCD and the bearer, and where the bearer has a configuration including at least a minimum bit-rate level of the bearer. As shown in FIG. 5, the gateway includes a network communication interface 46, a processing unit 48, and non-transitory data storage 50, all of which could be integrated together or communicatively linked together by a system bus, network, or other connection mechanism 52.

The network communication interface 46 could comprise one or more wired and/or wireless Ethernet interfaces or other physical network connection mechanisms, through which the gateway send and receive data communications, including communications on the bearer at issue as well as communications with other core network entities. The processing unit 48 could then comprise one or more general purpose processors (e.g., microprocessors) and/or one or more specialized processors (e.g., application specific integrated circuits). And the data storage 50 could comprise one or more volatile and/or non-volatile storage units (e.g., magnetic, optical, or flash storage).

As further shown, the data storage 50 could hold program instructions 54, which could be executable by the processor to cause the gateway to carry out operations such as those described above. For instance, the instructions could be executable by the processor to detect a change in quantity of the at least one relay base station served by the WCD and, in response to the detected change in quantity of the at least one relay base station served by the WCD, to modify the configuration of the bearer, including at least modifying the minimum bit-rate level of the bearer. Various features discussed above could then be applied in this context as well.

Exemplary embodiments have been described above. Those skilled in the art will understand, however, that changes and modifications may be made to these embodiments without departing from the true scope and spirit of the invention.

What is claimed is:

1. A method for configuring a bearer that carries data between a wireless communication device (WCD) and a gateway, wherein the bearer extends via a donor base station that serves the WCD, wherein the WCD serves at least one relay base station, wherein data flows between each of the at least one relay base station and the gateway via the WCD and the bearer, and wherein the bearer has a configuration including at least a service level of the bearer, the method comprising:
    detecting a change in quantity of the at least one relay base station served by the WCD; and
    in response to the detected change in quantity of the at least one relay base station served by the WCD, modifying the configuration of the bearer, including at least modifying the service level of the bearer.

2. The method of claim 1, carried out by the gateway.

3. The method of claim 1,
    wherein detecting the change in quantity of the at least one relay base station served by the WCD comprises detecting an increase in the quantity of the at least one relay base station served by the WCD,
    wherein the service level of the bearer comprises a guaranteed minimum bit-rate of the bearer, and
    wherein modifying the configuration of the bearer in response to the detected change comprises increasing the guaranteed minimum bit-rate level of the bearer due to the increase in the quantity of the at least one relay base station served by the WCD.

4. The method of claim 1, wherein, for each relay base station served by the WCD, the gateway receives via the WCD from the relay base station an Internet Protocol (IP) address assignment request, and wherein detecting the change in quantity of the at least one relay base station served by the WCD is based on receipt of a new IP address assignment request from a new relay base station via the WCD.

5. The method of claim 4, wherein the new IP address assignment request traverses the bearer or an associated bearer from the WCD to the gateway.

6. The method of claim 4, wherein the IP address assignment request comprises a Dynamic Host Control Protocol (DHCP) DISCOVER request.

7. The method of claim 1, wherein, for each relay base station served by the WCD, an IP address assignment passes from the gateway to the relay base station via the WCD, and wherein detecting the change in quantity of the at least one relay base station served by the WCD is based on a new IP address assignment passing to a new relay base station via the WCD.

8. The method of claim 7, wherein the new IP address assignment traverses the bearer or an associated bearer from the gateway to the WCD.

9. The method of claim 1, wherein modifying the configuration of the bearer in response to the detected change comprises (i) updating a bearer context record at the gateway and (ii) transmitting from the gateway a modify-bearer request that triggers updating of a bearer context record respectively at each of one or more entities in a path of the bearer.

10. The method of claim 9, wherein the gateway is a packet data network gateway (PGW), wherein the transmitting is to a serving gateway (SGW), and wherein the one or more entities includes the SGW and the donor base station.

11. A gateway arranged to configure a bearer that carries data between a wireless communication device (WCD) and the gateway, wherein the bearer extends via a donor base station that serves the WCD, wherein the WCD serves at least one relay base station, wherein data flows between each of the at least one relay base station and the gateway via the WCD and the bearer, and wherein the bearer has a configuration including at least a minimum bit-rate level of the bearer, the gateway comprising:
    a network communication interface through which the gateway communicates on the bearer;
    a processing unit; and
    program instructions executable by the processing unit to cause the gateway to (i) detect a change in quantity of the at least one relay base station served by the WCD and (ii) in response to the detected change in quantity of the at least one relay base station served by the WCD, modify the configuration of the bearer, including at least modifying the minimum bit-rate level of the bearer.

12. The gateway of claim 11,
    wherein detecting the change in quantity of the at least one relay base station served by the WCD comprises detecting an increase in the quantity of the at least one relay base station served by the WCD, and
    wherein modifying the configuration of the bearer in response to the detected change comprises increasing the minimum bit-rate level of the bearer due to the increase in the quantity of the at least one relay base station served by the WCD.

13. The gateway of claim 11, wherein, for each relay base station served by the WCD, the gateway receives a Dynamic Host Control Protocol (DHCP) DISCOVER request via the WCD, and wherein detecting the change in quantity of the at least one relay base station served by the WCD is based on receipt of a new DHCP DISCOVER request from a new relay base station via the WCD.

14. The gateway of claim 11, wherein, for each relay base station served by the WCD, an IP address assignment passes from the gateway to the relay base station via the WCD, and wherein detecting the change in quantity of the at least one relay base station served by the WCD is based on a new IP address assignment passing from the gateway to a new relay base station via the WCD.

15. The gateway of claim 11, wherein modifying the configuration of the bearer in response to the detected change comprises (i) updating a bearer context record at the gateway and (ii) transmitting from the gateway a modify-bearer request that triggers updating of a bearer context record respectively at each of one or more entities in a path of the bearer.

16. The gateway of claim 15, wherein the gateway is a packet data network gateway (PGW), wherein the transmitting is to a serving gateway (SGW), and wherein the one or more entities includes the SGW and the donor base station.

17. A system comprising:
a gateway;
a donor base station;
a wireless communication device (WCD); and
at least one relay base station,
wherein the donor base station serves the WCD,
wherein the WCD serves each of the at least one relay base station,
wherein a bearer extends between the WCD and the gateway via the donor base station, and wherein data flows between each of the at least one relay bas station and the gateway via the WCD and the bearer, and
wherein the bearer has a configuration including at least a minimum bit-rate level of the bearer, and
wherein the gateway is arranged to modify the configuration of the bearer, including modifying at least the minimum bit-rate level of the bearer, in response to detecting a change in quantity of the at least relay base station served by the WCD.

18. The system of claim 17,
wherein the gateway is further arranged to detect the change in quantity of the at least one relay base station served by the WCD,
wherein the change in quantity of the at least one relay base station served by the WCD comprises an increase in the quantity of the at least one relay base station served by the WCD, and
wherein modifying the configuration of the bearer in response to detecting the change in quantity of the at least one relay base station served by the WCD comprises increasing the minimum bit-rate level of the bearer due to the increase in the quantity of the at least one relay base station served by the WCD.

19. The system of claim 17, wherein, for each relay base station served by the WCD, the gateway receives a Dynamic Host Control Protocol (DHCP) DISCOVER request via the WCD, wherein the gateway is arranged to detect the change in quantity of the at least one relay base station served by the WCD based on the gateway receiving a new DHCP DISCOVER request from a new relay base station via the WCD.

20. The system of claim 17, wherein the gateway is arranged to modify the configuration of the bearer at least by (i) updating a bearer context record at the gateway and (ii) transmitting from the gateway a modify-bearer request that triggers updating of a bearer context record respectively at each of one or more entities in a path of the bearer.

* * * * *